United States Patent
Oda et al.

(10) Patent No.: US 6,876,542 B2
(45) Date of Patent: Apr. 5, 2005

(54) NITROGEN CONTAINING METAL POWDER, PRODUCTION PROCESS THEREFOR, AND POROUS SINTERED BODY AND SOLID ELECTROLYTIC CAPACITOR USING SAME

(75) Inventors: Yukio Oda, Yokohama (JP); Isayuki Horio, Kooriyama (JP)

(73) Assignee: Cabot Supermetals K.K., Tokyo (JP)

( * ) Notice: Subject to any disclaimer, the term of this patent is extended or adjusted under 35 U.S.C. 154(b) by 0 days.

(21) Appl. No.: 10/486,521

(22) PCT Filed: Aug. 13, 2002

(86) PCT No.: PCT/JP02/08254
§ 371 (c)(1),
(2), (4) Date: Feb. 10, 2004

(87) PCT Pub. No.: WO03/015961
PCT Pub. Date: Feb. 27, 2003

(65) Prior Publication Data
US 2004/0205947 A1 Oct. 21, 2004

(30) Foreign Application Priority Data
Aug. 15, 2001 (JP) .......... 2001-246570

(51) Int. Cl.[7] .............................................. H01G 9/04
(52) U.S. Cl. .................. 361/528; 361/529; 75/252; 75/369; 252/62.2; 29/25.03
(58) Field of Search .................. 361/523, 528–529, 361/532; 75/363, 369, 245, 255; 252/62.2; 29/25.03

(56) References Cited

U.S. PATENT DOCUMENTS

| | | | |
|---|---|---|---|
| 4,019,998 A | * | 4/1977 | Benson et al. ............... 510/377 |
| 4,684,399 A | | 8/1987 | Bergman et al. .......... 75/0.5 BB |
| 5,448,447 A | | 9/1995 | Chang ......................... 361/529 |
| 6,051,044 A | | 4/2000 | Fife ............................. 75/229 |
| 6,136,062 A | * | 10/2000 | Loffelholz et al. ............. 75/369 |
| 6,238,456 B1 | | 5/2001 | Wolf et al. .................... 75/245 |
| 6,432,161 B1 | | 8/2002 | Oda et al. ...................... 75/363 |
| 6,558,447 B1 | * | 5/2003 | Shekhter et al. .............. 75/252 |

FOREIGN PATENT DOCUMENTS

| | | | |
|---|---|---|---|
| EP | 0 953 847 A1 | 2/1998 | .......... G01R/31/26 |
| JP | 06-025701 | 2/1994 | ............ B22F/1/00 |
| JP | 7-508618 | 9/1995 | ............ H01G/9/00 |
| JP | 10-242004 | 9/1995 | .......... H01G/9/052 |

(Continued)

OTHER PUBLICATIONS

Sasaki et al., Electrical Properties and Auger Electron Spectroscopy Analysis of Oxide Layers Formed by Anodization on Nb–Ta and Nb–Ta–N films, Thin Solid Films, 74 pp 83–88 (1980).
Search Report for PCT/JP02/08254 dated Nov. 19, 2002.
Written Opinion for PCT/JP02/08254 dated May 20, 2003.
International Preliminary Examination Report for PCT/JP02/08254 dated Aug. 26, 2003.

*Primary Examiner*—Anthony Dinkins
(74) *Attorney, Agent, or Firm*—Kilyk & Bowersox, P.L.L.C.

(57) ABSTRACT

A nitrogen containing metal powder wicth a large specific surface area, and containing a suitable quantity of nitrogen dispersed uniformly within the metal is produced with good productivity, and provides a solid electrolytic capacitor with a high capacitance, minimal leakage current, and excellent long term reliability. This nitrogen containing metal powder has a ratio W/S between the nitrogen content W [ppm] of the powder, and the specific surface area S [$m^2/g$], as measured by a BET method, that falls within a range from 500 to 3000. This type of powder can be produced by a process in which a metal salt containing the metal is reacted with a reducing agent and undergoes reduction within a diluent salt, thereby generating the metal, wherein a nitrogen containing gas is introduced into the space contacting the reaction melt comprising the metal salt, the reducing agent and the diluent salt, thereby generating the metal and incorporating the nitrogen within the metal.

20 Claims, 1 Drawing Sheet

FOREIGN PATENT DOCUMENTS

| | | | | |
|---|---|---|---|---|
| JP | 08-239207 | 9/1996 | ........... | C01B/21/06 |
| JP | 2000-226602 | 8/2000 | ........... | B22F/1/00 |
| JP | 2001-223141 | 8/2001 | .......... | H01G/9/052 |
| JP | 2001-512531 | 8/2001 | ........... | B22F/1/00 |
| JP | 2002-30301 | 1/2002 | ............ | B22F/1/00 |
| JP | 2002-93666 | 3/2002 | .......... | H01G/9/052 |
| WO | WO 94/25971 | 11/1994 | ............. | H01G/9/05 |
| WO | WO 98/19811 | 5/1998 | ............. | B22F/1/00 |
| WO | WO 98/37249 | 8/1998 | ............. | C22C/1/04 |
| WO | WO 98/38600 | 9/1998 | ............. | G07C/9/00 |
| WO | WO 99/36811 | 7/1999 | ............. | G02B/5/28 |

\* cited by examiner

NITROGEN CONTAINING METAL POWDER, PRODUCTION PROCESS THEREFOR, AND POROUS SINTERED BODY AND SOLID ELECTROLYTIC CAPACITOR USING SAME

This application is a National Stage Application of PCT/JP02/08254, filed Aug. 13, 2002.

TECHNICAL FIELD

The present invention relates to a nitrogen containing metal powder suitable for use as the anode electrode raw material for a solid electrolytic capacitor, and a production process therefor, as well as a porous sintered body and a solid electrolytic capacitor using such a metal powder.

BACKGROUND ART

In recent years, electronic integrated circuits have required lower voltage driving, and a shift to higher frequencies and lower noise, and similarly, for solid electrolytic capacitors, the demands for lower ESR values and lower ESL values are increasing. Examples of suitable metal powders used as the anode electrode of a solid electrolytic capacitor include niobium, tantalum, titanium, tungsten, and molybdenum.

Of these, tantalum capacitors using tantalum are small and display a low ESR value and a high capacitance, and are consequently rapidly becoming widespread as components in mobile telephones and personal computers and the like. Nowadays, even higher capacitances (higher CV values) and lower ESR values are being sought, and fine tantalum powders with large specific surface area values are being developed to increase the capacitance of the capacitors. For example, currently, tantalum powder with a BET specific surface area of approximately 1 $m^2/g$ (equivalent to a specific surface area calculated primary particle average diameter $d''_{50}=400$ nm), capable of producing a capacitor with a specific capacitance of 50,000 CV is being mass produced using a process in which primary particles obtained by the thermal reduction of tantalum potassium fluoride with sodium are subjected to heat aggregation, and then deoxygenated.

On the other hand, in the case of niobium capacitors using niobium, the dielectric constant of niobium oxide is large, and niobium is cheaper than tantalum, and consequently, the utilization of niobium in solid electrolytic capacitors has been the subject of research for many years. However, due to the low level of reliability of the chemically converted oxide film, no practical applications have yet been achieved. In other words, when niobium undergoes chemical oxidation at high voltages, an amorphous oxide film crystallizes, creating the problems of an increased leakage current, and an increased frequency of failure of the capacitor.

However, with the recent trend towards reduced driving voltages for electronic circuits, the chemical conversion voltage has been able to be lowered. If the chemical conversion voltage is low, then the reliability of the niobium can be maintained, and consequently the environment continues to become more favorable for practical applications of niobium capacitors. In particular, niobium capacitors with high capacitances and smaller ESR and ESL values than aluminum electrolytic capacitors are currently being developed as potential alternatives to aluminum electrolytic capacitors.

In order to produce a high capacitance niobium capacitor, the primary particle average diameter $d_{50}$ calculated from the BET specific surface area should typically be no more than 500 nm, and preferably no more than 400 nm, in a similar manner to the case described for tantalum. Currently, known processes for producing fine niobium powder include the sodium reduction of potassium niobate fluoride (U.S. Pat. No. 4,684,399), the gas phase hydrogen reduction of niobium pentachloride (Japanese Unexamined Patent Application, First Publication No. Hei 6-25701), and a process for producing a high specific surface area niobium powder using a crushing process (WO98/19811).

Of these processes, because conventional gas phase hydrogen reduction processes form monodispersed ultrafine particles, during the step for forming a porous sintered body and conducting chemical oxidation, insulation of the neck section, namely necking rupture, occurs, making it impossible to produce a powder suitable for an anode electrode. Furthermore, the crushing process is simple and offers a good level of production efficiency, but the shape of the particles is irregular, and the particle size distribution is broad, which causes a variety of problems when applied to an anode electrode.

Accordingly, it is considered that in order to produce a niobium powder that is a chain-like powder suitable for an anode electrode, and also displays a sharp particle size distribution peak for the primary particles, liquid phase processes such as a process in which a potassium fluoride salt is subjected to molten salt reduction using sodium or the like, or a process in which a niobate material is reduced with a molten metal are preferred.

In this manner, in order to enable further increases in capacitor capacitance, the move towards finer niobium powders and tantalum powders with increased specific surface areas has continued, and a variety of processes for producing these types of fine metal powders are currently under investigation.

However, if the specific surface area of the powder is increased in this manner, then the oxygen content in the powder increases, and as a result, a problem arises in that crystalline oxides, which can cause increased leakage current, are more likely to be generated during the heat treatment step or the chemical oxidation step. Furthermore, as the rated voltage of the capacitor is lowered, the chemical conversion voltage required to form the dielectric oxide film also reduces, but this reduction in the chemical conversion voltage tends to cause a thinning of the film thickness of the dielectric oxide film that is formed, causing a problem in that although the capacitance increases, the long term reliability tends to deteriorate.

A known process for suppressing this oxygen effect, and improving the reliability of thin films is a process in which following production of the sintered body or the dielectric oxide film, the sintered body or dielectric oxide film is doped with nitrogen.

For example, in U.S. Pat. No. 5,448,447, nitrogen doping is used to reduce the leakage current, and improve both the stability and the reliability of the chemical oxidation film at high temperatures. Furthermore, in WO98/37249, a process in which ammonium chloride is added to the reduction powder, and nitrogen is introduced during the heat aggregation step is disclosed as a process for achieving uniform nitrogen doping of a high capacitance tantalum powder.

In addition, other examples include reduction of the leakage current by doping a niobium sputtered Nb—O film with nitrogen (K. Sasaki et al., Thin Solid Films, 74 (1980) 83–88), and improvement of the leakage current by using a niobium nitride sintered body anode (WO98/38600).

Furthermore, Japanese Unexamined Patent Application, First Publication No. Hei 8-239207 discloses heated nitridation processes in which a heating aggregation step of a tantalum or niobium powder produced by reduction, and a deoxygenation step are conducted in a nitrogen containing gas atmosphere.

However, in each of these conventional processes, the nitridation occurs from the surface of the particles or the surface of the film, meaning the nitridation reaction controls the rate of nitrogen diffusion rate, and as a result, the nitridation is prone to occurring non-uniformly. If the nitridation occurs non-uniformly, then the product particles also become non-uniform, making the product unsuitable as an anode electrode raw material.

In addition, if the nitrogen content exceeds 3000 ppm, then for example in the case of a metal powder of tantalum, crystalline nitrides such as $TaN_{0.04}$, $TaN_{0.1}$, and $Ta_2N$ are more easily generated, and if the nitrogen content is increased even further, then a crystalline phase is generated comprising TaN and $Ta_2N$ and the like as primary components. If these types of crystalline nitrides are generated, the specific capacitance of the produced capacitor falls, and the reliability of the dielectric oxide film also decreases. Furthermore, because crystalline nitrides are hard, if a metal powder comprising such nitrides is subjected to press molding during an anode electrode production process, then the mold can sometimes be damaged.

Furthermore, in those processes in which a sintered body or a dielectric oxide film is produced, and subsequently doped with nitrogen, the nitridation step must be provided as an additional step, which raises the problem of reduced productivity.

Taking the above circumstances into consideration, the inventors of the present invention have proposed, in Japanese Unpublished Patent Application No. 2000-31029, a nitrogen containing metal powder comprising a fine powder of niobium or tantalum doped uniformly with a satisfactory quantity of nitrogen, in which the nitrogen does not form a crystalline compound, but is incorporated within the metal crystal lattice in a solid solution type state, as well as a production process for such a nitrogen containing metal powder. This is a process wherein during the step in which the raw material compounds of niobium or tantalum are reacted with a reducing agent and undergo reduction within a diluent salt, a nitrogen containing gas is bubbled through the diluent salt, thereby introducing nitrogen into the metal. However, this process may result in excessive nitrogen doping, and this tendency becomes increasingly marked as the metal powder becomes finer or increases in surface area.

DISCLOSURE OF INVENTION

The present invention takes the above factors into consideration, with an object of providing a nitrogen containing metal powder with a large specific surface area, and containing a suitable quantity of nitrogen dispersed uniformly within the metal, as well as a process for producing this metal powder with good productivity, a porous sintered body obtained from the metal powder, and a solid electrolytic capacitor with a high capacitance, minimal leakage current and excellent long term reliability, produced from the porous sintered body.

A nitrogen containing metal powder of the present invention is a metal powder that contains nitrogen, wherein the ratio W/S between the nitrogen content W [ppm], and the specific surface area S [$m^2/\mu g$], as measured by a BET method, is within a range from 500 to 3000.

The aforementioned nitrogen preferably exists as a solid solution within the metal.

The aforementioned metal is preferably at least one metal selected from a group consisting of niobium, tantalum, and niobium-tantalum alloy.

A production process for a nitrogen containing metal powder according to the present invention is a process in which a metal salt containing the metal is reacted with a reducing agent and undergoes reduction within a diluent salt, thereby generating the metal, wherein a nitrogen containing gas is introduced into a space contacting the reaction melt comprising the metal salt, the reducing agent and the diluent salt, thereby generating the metal and incorporating nitrogen within the metal.

The aforementioned metal salt is preferably a potassium fluoride salt of at least one of niobium and tantalum, and the reducing agent is preferably sodium.

Furthermore, the reducing agent and the metal salt are each preferably added continuously or in portions to the diluent salt.

A porous sintered body according to the present invention is produced by sintering any of the nitrogen containing metal powders described above.

A solid electrolytic capacitor according to the present invention is equipped with an anode electrode formed from the above porous sintered body.

BEST MODE FOR CARRYING OUT THE INVENTION

Figure 1:
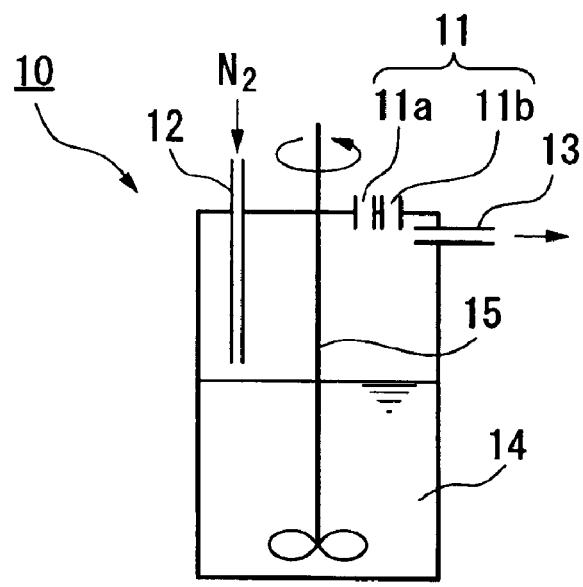
FIG. 1 is a schematic cross sectional view showing one example of a reaction vessel used in a production process of the present invention.

As follows is a more detailed description of the present invention.

A nitrogen containing metal powder of the present invention is a metal powder that contains nitrogen, in which the ratio W/S between the nitrogen content W [ppm] within the nitrogen containing metal powder, and the specific surface area S [$m^2/g$], as measured by a BET method, is within a range from 500 to 3000.

There are no particular restrictions on the metal, although at least one metal selected from a group consisting of niobium, tantalum, and niobium-tantalum alloy is preferred, as when these metals are used as the raw material for the anode electrode of a solid electrolytic capacitor, a high capacitance capacitor can be formed.

In those cases where an anode electrode is formed from this nitrogen containing metal powder and this anode electrode is then used within a capacitor, the nitrogen contained within the nitrogen containing metal powder exhibits the effect of suppressing and lowering the leakage current of the capacitor. Provided the nitrogen is incorporated within the metal powder with an W/S ratio as described above, the nitrogen content W will fall within the suitable range regardless of the specific surface area of the powder, enabling a capacitor with minimal leakage current and excellent long term reliability to be obtained.

At W/S ratios of less than 500, the effects of the nitrogen addition are not manifested satisfactorily, whereas in contrast, if the W/S ratio exceeds 3000, then the quantity of nitrogen becomes excessive, which increases the possibility of the generation of crystalline nitrides, which can cause a decrease in the capacitance of the capacitor, and a deterioration in the reliability of the dielectric oxide film. An even more desirable W/S range is from 500 to 2000. The nitrogen content W within a nitrogen containing metal powder is determined using a commercially available oxygen/nitrogen analyzer (EMGA520, manufactured by Horiba, Ltd.), by a method in which a sample is subjected to impulse melting in a helium gas atmosphere, and the generated gas is measured by TCD (thermal conductivity detection).

The form of the nitrogen within the nitrogen containing metal powder is preferably a solid solution of the nitrogen within the metal.

When nitrogen undergoes solid dissolution in a metal, the lattice constant of the metal crystals changes. Accordingly, the solid dissolution of nitrogen into the metal can be confirmed by a shift in the position of the X-ray diffraction peak. For example, when 3000 ppm of nitrogen undergoes solid dissolution in tantalum, the planar spacing d for the (110) plane of the metal tantalum increases approximately 0.1%, from d=0.23375 nm (=2.3375 Å) to d=0.23400 nm (=2.3400 Å).

In contrast, if the nitrogen forms a crystalline nitride within the metal, then as described above, the capacitance of the capacitor and the reliability of the dielectric oxide film may deteriorate.

Furthermore, the specific surface area S of the nitrogen containing metal powder is preferably at least 1.0 [$m^2/g$], and more specifically, in the case of tantalum metal is preferably within a range from 1.0 to 4.0 [$m^2/g$], and in the case of niobium metal is preferably within a range from 2.0 to 8.0 [$m^2/g$]. Provided the specific surface area S falls within this type of range, a high capacitance capacitor can be obtained. In other words, if a nitrogen containing metal powder with a W/S ratio of 500 to 3000 and a specific surface area that falls within the above type of range is used, a capacitor with a high capacitance, minimal leakage current, and excellent long term reliability can be obtained. In such cases, the BET specific surface area referenced average particle diameter d of the nitrogen containing metal powder is determined by the spherical conversion formula d=6/(metal density×BET specific surface area), and for example, in the case of tantalum, niobium, or a tantalum-niobium alloy, falls within a range from approximately 90 to 350 nm.

This type of nitrogen containing metal powder is produced by a process in which a metal salt containing the metal is reacted with a reducing agent and undergoes reduction within a molten diluent salt, thereby generating the metal, and by introducing a nitrogen containing gas into the space contacting the reaction melt comprising the metal salt, the reducing agent and the diluent salt, thereby ensuring that the gas phase section of the reaction system is a nitrogen containing gas environment.

There are no particular restrictions on the metal salt used, although in those cases in which the metal is at least one metal selected from a group consisting of niobium, tantalum and niobium-tantalum alloy, a potassium fluoride salt is preferred. If a potassium fluoride salt is used, then chain-like particles can be produced that are ideal for the production of a porous sintered body for use as an anode electrode. Specific examples of the potassium fluoride salt include $K_2TaF_7$, $K_2NbF_7$, and $K_2NbF_6$. Other possible metal salts include chlorides such as niobium pentachloride, lower niobium chlorides, tantalum pentachloride and lower tantalum chlorides, as well as other halides such as iodides and bromides. Particularly in those cases in which the metal is niobium, the use of niobate fluoride salts such as potassium niobate fluoride is also possible.

Suitable examples of the reducing agent include alkali metals and alkali earth metals such as sodium, magnesium and calcium, and hydroxides of these metals such as magnesium hydroxide and calcium hydroxide, although of these, sodium is preferred. In those cases in which a potassium fluoride salt is used as the metal salt, by using sodium as the reducing agent, the fluorine within the potassium fluoride salt and the sodium undergo a reaction, generating a sodium fluoride product, and because this fluoride product is water soluble, it can be easily removed in a subsequent step.

Suitable examples of the nitrogen containing gas include gases that contain nitrogen gas, and nitrogen generating gases such as ammonia and urea which generate nitrogen gas on heating, and any gas capable of converting the inside of the reduction reaction system to a nitrogen gas containing atmosphere is suitable. However, in order to efficiently incorporate nitrogen within the metal, the concentration of nitrogen gas within the nitrogen containing gas atmosphere is preferably maintained at a level of 50 vol % or higher, and the use of substantially pure nitrogen gas with a nitrogen concentration of approximately 100%, or of pure nitrogen gas diluted suitably with argon gas is particularly preferred. If the nitrogen gas concentration in the nitrogen containing gas atmosphere is less than 10 vol %, then a sufficient quantity of nitrogen may not be able to be incorporated within the metal.

Furthermore, the diluent salt can use KCl, NaCl, KF, or a eutectic salt thereof.

As follows is a description of a specific example of the production of a nitrogen containing metal powder, using tantalum as the metal, and with reference to FIG. 1.

FIG. 1 shows a reaction vessel 10 formed from nickel and inconel clad materials, equipped with a raw material inlet 11, a nitrogen containing gas inlet tube 12, and a nitrogen containing gas discharge tube 13. The raw material inlet 11 comprises a metal salt inlet port 11a and a reducing agent inlet port 11b. Furthermore, the reaction vessel 10 is also equipped with a stirring blade 15.

First, a diluent salt 14 is introduced into the reaction vessel 10. Subsequently, a nitrogen containing gas is introduced from the nitrogen containing gas inlet tube 12 and discharged from the nitrogen containing gas discharge tube 13, thereby circulating the nitrogen containing gas through the inside of the reaction vessel 10. With the inside of the reaction vessel 10 maintained under a nitrogen containing gas atmosphere, the diluent salt 14 is heated to 800 to 900° C. and melted, and a portion of a potassium fluoride salt of tantalum, which functions as the raw material, is added through the metal salt inlet port 11a. Subsequently, the reducing agent sodium is introduced from the reducing agent inlet port 11b, in the stoichiometric quantity required for reduction of the previously introduced potassium fluoride salt. In this manner, the reaction represented by the equation (1) shown below occurs in the reaction vessel 10. Furthermore, during the reaction, the stirring blade 15 is operated, thereby gently stirring the reaction melt.

$$K_2TaF_7 + 5Na \rightarrow 2KF + 5NaF + Ta \qquad (1)$$

In the reaction vessel 10 shown in FIG. 1, the nitrogen containing gas inlet tube 12 is positioned so as not to be immersed in the molten reaction liquid. Accordingly, the nitrogen containing gas is not introduced by bubbling through the reaction melt, but is simply introduced onto the top of the reaction melt.

The quantity of the diluent salt 14 is preferably set to a mass that is approximately 2 to 10 fold that of the combined mass of the potassium fluoride salt and the sodium. If the mass of the diluent salt 14 is less than 2 fold, then the reaction rate is high due to the high concentration of the raw material potassium fluoride salt, which may lead to the particle diameter of the generated metal powder becoming overly large. In contrast, if the mass of the diluent salt 14 exceeds 10 fold, then the reaction rate decreases, and the productivity falls. Furthermore, as the quantity of the diluent salt 14 is increased, the specific surface area of the produced nitrogen containing metal powder also increases. In other words, the quantity of the diluent salt 14 can be used to suitably control the specific surface area of the powder.

Subsequently, when the reaction between the introduced potassium fluoride salt and the sodium is substantially complete, the flow of the nitrogen containing gas is continued, and further portions of the potassium fluoride salt and sodium are added. In this manner, the reaction of small quantities of the raw materials, namely the potassium fluoride salt and the sodium, is repeated until the reduction reaction of the tantalum potassium fluoride salt is completed.

By using a reaction vessel 10 such as that shown in FIG. 1 in this manner, and introducing the nitrogen containing gas into the space contacting the reaction melt comprising the metal salt, the reducing agent and the diluent salt 14, and onto the top of the reaction melt in the case above, while the reduction reaction of the metal salt is carried out, the metal salt undergoes reduction through the action of the reducing agent, and also contacts the nitrogen containing gas at the interface between the reaction melt and the nitrogen containing gas. Consequently, the reduction reaction of the metal salt, and the incorporation of nitrogen within the metal produced by the reduction reaction, proceed in a continuous manner. The reduced metal containing added nitrogen has a larger specific gravity than the diluent salt, and consequently sinks down through the reaction melt. The rotational speed of the stirring blade 15 is set to a level that does not impede the settling of the metal.

According to this type of process, because the reaction melt and the nitrogen containing gas are only in contact at the interface between the two, the degree of contact between the metal and the nitrogen can be suppressed to a lower level than in a process in which the nitrogen containing gas inlet tube is immersed within the reaction melt, and the nitrogen containing gas is bubbled through the melt. Furthermore, the reduced metal containing added nitrogen sinks down through the reaction melt and is distanced from this interface, meaning it cannot re-contact the nitrogen gas. In other words, the introduction of nitrogen into the metal is essentially restricted to metal that has just been reduced, and the degree of nitrogen incorporation is controlled, and consequently, the nitrogen is not incorporated into the metal powder in excessive quantities, and the quantity of nitrogen incorporated within the metal is uniform throughout the powder particles.

As a result, even if the specific surface area of the metal powder is large, only the minimum required quantity of nitrogen is added to the metal powder, and a nitrogen containing metal powder with a W/S ratio between the nitrogen content W [ppm] and the specific surface area S [$m^2$/g], as measured by a BET method, that falls within a range from 500 to 3000 can be generated with good stability.

Figure 2:
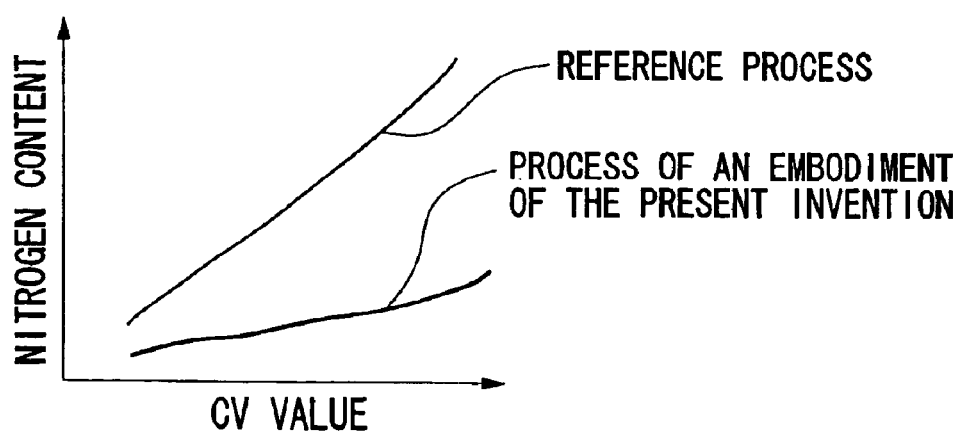
FIG. 2 is a graph showing a schematic representation of the relationship between the CV value and the nitrogen content for a nitrogen containing metal powder produced by a production process of the present invention, and a nitrogen containing metal powder produced by a reference process (the process disclosed in Japanese Unpublished Patent Application No. 2000-31029).

In other words, in the reference process in which the nitrogen containing gas is bubbled through the reaction melt, as shown schematically in FIG. 2, the nitrogen content of the powder increases significantly as the CV value (the horizontal axis) increases. Here, the CV value is a value that displays a positive correlation with the specific surface area of the metal powder (tantalum powder in FIG. 2): However, in a process of the present invention such as that shown in FIG. 1, in which the nitrogen containing gas is introduced onto the top of the reaction melt, thereby contacting the melt, the nitrogen content of the powder still increases slightly as the CV value (the horizontal axis) increases, although the degree of that increase is smaller than that of the product obtained in the reference process.

Accordingly, in the reference process there is a possibility of excessive nitrogen doping of the metal, and the tendency for such excessive doping increases markedly as the specific surface area of the metal powder increases, whereas in the embodiment of the present invention, only the minimum required quantity of nitrogen is added to the metal powder, even if the specific surface area of the metal powder is large.

In addition to the process wherein the metal salt and the reducing agent are added to the diluent salt 14 in portions, each component may also be added continuously at a predetermined rate of addition. By adding the metal salt and the reducing agent either in portions, or continuously, the rapid temperature rises resulting from reaction heat that are seen in processes where the components are added in a single batch are not observed, enabling the production of a fine nitrogen containing metal powder with a uniform particle size distribution.

Following completion of the reduction reaction, the reaction melt is cooled, and by washing the resulting agglomerate repeatedly with water or a weakly acidic aqueous solution to remove the diluent salt, the nitrogen containing metal powder is obtained. At this stage, if required, a separation operation using centrifugal separation or filtration or the like may also be conducted, and the particles may also be washed and purified with a solution containing dissolved hydrofluoric acid and hydrogen peroxide.

By subjecting the nitrogen containing metal powder obtained in this manner to pretreatments including heat aggregation, deoxygenation, and gradual oxidation stabilization treatment, and subsequently molding and sintering the powder, a porous sintered body can be produced.

Heat aggregation is performed by heating the nitrogen containing metal powder in a vacuum to cause aggregation, and is conducted to convert the ultra fine particles in the powder to secondary particles with a comparatively larger particle size. A porous sintered body obtained by molding and sintering comparatively larger secondary particles has larger pores than a porous sintered body obtained from ultra fine particles, and consequently when the porous sintered body is used as an anode electrode, the electrolyte solution penetrates right inside the porous sintered body, enabling an increase in the capacitance. Furthermore, by performing the heating in a vacuum, impurities in the nitrogen containing metal powder that are derived from the diluent salt, such as sodium and magnesium, can also be removed.

The heat aggregation is typically conducted by heating the nitrogen containing metal powder in a vacuum at 800 to 1400° C. for a period of 0.5 to 2 hours. Prior to the heat aggregation step, it is preferable to conduct a preliminary aggregation by agitating the nitrogen containing metal powder while sufficient water is added to uniformly wet the entire powder sample. By carrying out this preliminary aggregation, a stronger aggregate body can be obtained.

Furthermore, by adding approximately 10 to 300 ppm of phosphorus or boron, relative to the quantity of metal, to the water added during this preliminary aggregation, the growth of fused primary particles can be suppressed, enabling the high surface area to be retained during the heat aggregation. Suitable forms for the added phosphorus include phosphoric acid, and ammonium phosphorus hexafluoride.

Subsequently, the cake-like powder obtained from the heat aggregation is crushed, either under a normal atmosphere or in the presence of an inert gas, and a reducing agent such as magnesium is then added, and the oxygen in the particles is reacted with the reducing agent, thereby effecting a deoxygenation.

The deoxygenation is conducted in an atmosphere of an inert gas such as argon, for a period of 1 to 3 hours, at a temperature greater than the melting point but less than the boiling point of the reducing agent. Then, during the subsequent cooling, air is introduced into the argon gas, thereby effecting a gradual oxidation stabilization treatment of the nitrogen containing metal powder, and any residual magnesium or other matter derived from the reducing agent such as magnesium oxide remaining in the powder is subsequently removed by washing with acid.

A porous sintered body is produced by adding approximately 3 to 5% by weight of camphor ($C_{10}H_{16}O$) or the like as a binder to the nitrogen containing metal powder that has undergone heat aggregation, deoxygenation and gradual oxidation stabilization treatment in the manner described above, and then performing press molding, and subsequent sintering by heating at 1000 to 1400° C. for a period of approximately 0.3 to 1 hour. The sintering temperature can be set appropriately in accordance with the type of metal, and the specific surface area of the powder.

In order to use this porous sintered body as an anode electrode, a lead is embedded into the nitrogen containing metal powder prior to the powder undergoing press molding, and the powder is then molded and sintered, thereby integrating the lead into the body. This integrated body is then placed in an electrolytic solution of phosphoric acid or nitric acid or the like with a concentration of 0.1% by weight, at a temperature of 30 to 90° C., the voltage is raised to 20 to 60 V with a current density of 40 to 80 mA/g, and the body is treated for 1 to 3 hours to effect chemical oxidation, forming a body that can be used as an anode electrode for a solid electrolytic capacitor.

In addition, a solid electrolytic capacitor can then be produced by using conventional methods to sequentially form a solid electrolyte layer of manganese dioxide, lead oxide or a conductive polymer or the like, a graphite layer, and a silver paste layer on top of the porous sintered body, subsequently connecting a negative electrode terminal by soldering or the like, and then forming an outer resin coating.

This type of nitrogen containing metal powder displays a ratio W/S between the nitrogen content W [ppm] within the nitrogen containing metal powder, and the specific surface area S [m²/g] of the nitrogen containing metal powder, as measured by a BET method, that falls within a range from 500 to 3000, and consequently contains an adequate quantity of nitrogen regardless of the size of the specific surface area S, and does not contain excess nitrogen within the particles. Accordingly, the powder contains almost none of the crystalline nitrides that are readily generated when excess nitrogen is present, and the nitrogen is incorporated in the form of a solid solution within the metal. Consequently, by using this type of nitrogen containing metal powder as the raw material for an anode electrode, a solid electrolytic capacitor with a high capacitance, minimal leakage current and excellent long term reliability can be produced. Furthermore, this type of nitrogen containing metal powder that contains almost no crystalline nitrides will not damage the mold during press molding to produce the anode electrode.

Furthermore, this type of nitrogen containing metal powder can be produced by a process in which a metal salt containing the metal is reacted with a reducing agent and undergoes reduction within a diluent salt 14, thereby generating the metal, wherein a nitrogen containing gas is introduced into a space contacting the reaction melt comprising the metal salt, the reducing agent and the diluent salt 14, thereby generating the metal and incorporating nitrogen within the metal. According to this type of process, contact with the nitrogen is restricted to metal that has just been reduced, and the degree of that contact can also be controlled, and consequently, a nitrogen containing metal powder containing a small quantity of uniformly dispersed nitrogen can be produced. Furthermore, because a separate step is not required for incorporating the nitrogen, the process displays excellent productivity.

EXAMPLES

As follows is a description of specifics of the present invention based on a series of examples, although the present invention is in now way restricted to these examples.

Example 1

In a 50 L reaction vessel 10 with the type of configuration shown in FIG. 1 was placed 15 kg each of potassium fluoride and potassium chloride as the diluent salts 14. Subsequently, pure nitrogen gas (purity 99.999%) as the nitrogen containing gas was introduced from the nitrogen containing gas inlet tube 12 and discharged through the nitrogen containing gas discharge tube 13, with a flow rate of 3 L/minute, thereby maintaining a nitrogen atmosphere inside the reaction vessel 10 while the diluent salts were heated to 850° C. and melted.

Subsequently, a single 200 g portion of tantalum potassium fluoride was added to the reaction vessel 10 from the metal salt inlet port 11a, and after one minute, 58 g of molten sodium was added through the reducing agent inlet port 11b, and the reaction was allowed to proceed for 6 minutes. This operation was repeated 30 times. During this period, the inside of the reaction vessel 10 was maintained under a nitrogen atmosphere, and the stirring blade 15 was operated continuously. The rotational speed of the stirring blade 15 was set to 150 rpm.

Following completion of the reduction reaction, the mixture was cooled, and the product agglomerate was crushed and washed with a weakly acidic aqueous solution, yielding particles of tantalum. The powder was then purified by washing with a cleaning solution containing hydrofluoric acid and hydrogen peroxide. The yield of reduced tantalum particles was 2.4 kg.

Next, a preliminary aggregation was conducted by agitating 100 g of the thus obtained tantalum powder (dried product), while sufficient water was added to uniformly wet the entire powder sample and form an agglomerated lump. Phosphoric acid was added in advance to the water, in sufficient quantity to generate approximately 100 ppm relative to the tantalum. In this case, the quantity of water required to produce an agglomerated lump was 25 ml. This agglomerated lump was then heated in a vacuum furnace at 1200° C. for 1 hour to effect heat aggregation.

The heat aggregated mass was then crushed coarsely using a ceramic roll crusher, and then crushed more finely, to a particle size of no more than 250 μm, in an argon atmosphere using a pin mill. Subsequently, 3 g of magnesium chips were mixed with 100 g of the crushed powder, and the mixture was held in a furnace under an argon atmosphere for 2 hours at 800° C., thereby allowing the oxygen in the tantalum and the magnesium to react, effecting a deoxygenation. During the subsequent cooling process, air was introduced into the argon gas to effect a gradual oxidation stabilization treatment of the tantalum powder, and after cooling the powder was removed from the furnace. The removed powder was then washed with a nitric acid solution to remove residual magnesium and magnesium oxide.

The values for the BET specific surface area S, the nitrogen content W, W/S, and the average particle size of the primary particles for the thus obtained tantalum powder are shown in Table 1. Furthermore, X-ray diffraction analysis of the tantalum powder confirmed that the incorporated nitrogen exists as a solid solution within the metal. Furthermore, no crystalline phases of compounds containing nitrogen were observed. The planar spacing for the Ta (110) plane was 0.23400 nm (=2.3400 Å).

(Preparation of a Porous Sintered Body)

Subsequently, 2% by weight of camphor was added as a binder to 0.15 mg of the tantalum powder, and following mixing, the mixture was press molded to prepare a molded body with a diameter of 3 mm and a density of 4.5 g/cm$^3$. This molded body was then heated in a vacuum sintering furnace at 1350° C. for 20 minutes, producing a porous sintered body.

(Chemical Oxidation Conditions)

The thus prepared porous sintered body was subjected to chemical oxidation (anodic oxidation) in a 10% by weight aqueous solution of phosphoric acid, under conditions including a chemical conversion voltage of 20 V, a temperature of 90° C., and a retention time of 120 minutes, thereby forming a dielectric oxide film.

(Measurement of Electrical Characteristics by Wet Methods)

Using this porous sintered body with a dielectric oxide film formed thereon, the electrical capacitance (CV value) was measured in a 30.5 vol % aqueous sulfuric acid solution, with a bias voltage of 1.5 V and a frequency of 120 Hz.

Furthermore, the direct leakage current (DLC) was the current value after 3 minutes under conditions of a voltage of 14 V in a 10% by weight aqueous phosphoric acid solution.

The results are shown in Table 1.

Example 2

With the exception of introducing a mixed gas containing 50 vol % of nitrogen and 50 vol % of argon through the nitrogen containing gas inlet tube 12, instead of the pure nitrogen gas (purity 99.999%), as the nitrogen containing gas, a tantalum powder was produced in the same manner as the example 1.

The values for the BET specific surface area S, the nitrogen content W, W/S, and the average particle size of the primary particles for the thus obtained tantalum powder are shown in Table 1. Furthermore, X-ray diffraction analysis of the tantalum powder confirmed that the incorporated nitrogen exists as a solid solution within the metal. Furthermore, no crystalline phases of compounds containing nitrogen were observed. The planar spacing for the Ta (110) plane was 0.23400 nm (=2.3400 Å).

Subsequently, the production of a porous sintered body, chemical oxidation, and the measurement of the electrical characteristics using wet methods were conducted in the same manner as the example 1. The results are shown in Table 1.

Example 3

With the exception of changing the quantities of tantalum potassium fluoride and sodium added within a single portion to 125 g and 38 g respectively, a tantalum powder was produced in the same manner as the example 1.

The values for the BET specific surface area S, the nitrogen content W, W/S, and the average particle size of the primary particles for the thus obtained tantalum powder are shown in Table 1. Furthermore, X-ray diffraction analysis of the tantalum powder confirmed that the incorporated nitrogen exists as a solid solution within the metal. Furthermore, no crystalline phases of compounds containing nitrogen were observed. The planar spacing for the Ta (110) plane was 0.23400 nm (=2.3400 Å).

Subsequently, with the exception of altering the sintering temperature to 1300° C., the production of a porous sintered body, chemical oxidation, and the measurement of the electrical characteristics using wet methods were conducted in the same manner as the example 1.

Example 4

Using the same reaction vessel 10 as the example 1, niobium potassium fluoride was substituted for tantalum potassium fluoride as the metal salt raw material, and a niobium powder was produced.

The quantity of niobium potassium fluoride added to the reaction vessel 10 in a single portion was set at 300 g, and the quantity of sodium added in a single portion was set at 115 g. During addition of these materials, the temperature of the reaction melt was measured, and the rising temperature curve was observed until the completion of the reaction (approximately 12 minutes). This operation was repeated 12 times. The remaining conditions were identical to those described for the example 1.

Subsequently, a niobium powder was produced in a similar manner to the example 1. The yield was 1.1 kg. The BET specific surface area S of the niobium powder at this point was 3.8 m$^2$/g, and the nitrogen content was 3100 ppm. Furthermore, X-ray diffraction analysis of the powder revealed no peaks other than niobium metal, confirming that the nitrogen had undergone solid dissolution within the niobium without forming other compounds.

Next, a preliminary aggregation was conducted by agitating 100 g of the thus obtained niobium powder (dried product) while sufficient water was added to uniformly wet the entire powder sample and form an agglomerated lump. Phosphoric acid was added in advance to the water, in sufficient quantity to generate approximately 100 ppm relative to the niobium. In this case, the quantity of water required to produce an agglomerated lump was 28 ml. This agglomerated lump was then heated in a vacuum furnace at 1150° C. for 1 hour to effect heat aggregation.

Subsequently, the same method as the example 1 was used to produce a niobium powder. The values for the BET specific surface area S, the nitrogen content W, W/S, and the average particle size of the primary particles for this niobium powder are shown in Table 1.

Furthermore, X-ray diffraction analysis of the powder revealed no peaks other than niobium metal, supporting the finding that the nitrogen had undergone solid dissolution within the niobium.

Subsequently, the production of a porous sintered body, chemical oxidation, and the measurement of the electrical characteristics using wet methods were conducted in a similar manner to the example 1. The results are shown in Table 1. During production of the molded body, the quantity of niobium powder used was 0.1 mg, and 2% by weight of camphor was added to this niobium. A molded body of diameter 3 mm with a density of 2.8 g/cm³ was produced. The sintering temperature was 1200° C.

Comparative Example 1

With the exception of immersing the nitrogen containing gas supply nozzle into the reaction melt and bubbling pure nitrogen gas through the reaction melt (flow rate: 3 L/minute), rather than circulating the pure nitrogen gas through the reaction vessel 10, a tantalum powder was prepared in the same manner as the example 1.

Subsequently, the production of a porous sintered body, chemical oxidation, and the measurement of the electrical characteristics using wet methods were conducted in the same manner as the example 1. The results are shown in Table 1.

Comparative Example 2

With the exception of immersing the nitrogen containing gas supply nozzle into the reaction melt and bubbling the mixed gas of pure nitrogen gas and argon gas through the reaction melt (flow rate: 3 L/minute), rather than circulating the mixed gas through the reaction vessel 10, a tantalum powder was prepared in the same manner as the example 2.

Subsequently, the production of a porous sintered body, chemical oxidation, and the measurement of the electrical characteristics using wet methods were conducted in the same manner as the example 1. The results are shown in Table 1.

Comparative Example 3

With the exception of immersing the nitrogen containing gas supply nozzle into the reaction melt and bubbling pure nitrogen gas through the reaction melt (flow rate: 3 L/minute), rather than circulating the pure nitrogen gas through the reaction vessel 10, a tantalum powder was prepared in the same manner as the example 3.

Subsequently, the production of a porous sintered body, chemical oxidation, and the measurement of the electrical characteristics using wet methods were conducted in the same manner as the example 1. The results are shown in Table 1.

Comparative Example 4

With the exception of immersing the nitrogen containing gas supply nozzle into the reaction melt and bubbling pure nitrogen gas through the reaction melt (flow rate: 3 L/minute), rather than circulating the pure nitrogen gas through the reaction vessel 10, a niobium powder was prepared in the same manner as the example 4.

Subsequently, the production of a porous sintered body, chemical oxidation, and the measurement of the electrical characteristics using wet methods were conducted in the same manner as the example 1. The results are shown in Table 1.

Comparative Example 5

With the exception of circulating argon gas that contained no nitrogen through the reaction vessel 10, rather than circulating pure nitrogen gas, a niobium powder was prepared under the same conditions as the example 4. As shown in Table 1, the thus obtained niobium powder contained 250 ppm of nitrogen, although this nitrogen is derived from nitrogen in the air, rather than having been forcibly introduced.

Subsequently, the production of a porous sintered body, chemical oxidation, and the measurement of the electrical characteristics using wet methods were conducted in the same manner as the example 1. The results are shown in Table 1.

TABLE 1

| | BET specific surface area S ($m^2/g$) | Nitrogen content W (ppm) | W/S | Average size of primary particles (nm) | XRD analysis results | Sintering temperature (° C.) | Electrical capacitance CV value ($\mu FV/g$) | Leakage current DLC ($\mu A/g$) | Specific leakage current DLC/CV (nA/g) |
|---|---|---|---|---|---|---|---|---|---|
| Example 1 | 2.4 | 2500 | 1041 | 150 | solid solution | 1350 | 88810 | 40.8 | 0.5 |
| Example 2 | 2.2 | 2000 | 909 | 164 | solid solution | 1350 | 87000 | 38.9 | 0.4 |
| Example 3 | 3.6 | 4000 | 1111 | 100 | solid solution | 1300 | 115900 | 83.2 | 0.7 |
| Example 4 | 3.0 | 3250 | 1083 | 233 | solid solution | 1200 | 75000 | 58.5 | 0.8 |
| Comparative example 1 | 2.6 | 8500 | 3269 | 139 | solid solution | 1350 | 90500 | 65.6 | 0.7 |
| Comparative example 2 | 2.5 | 8800 | 3520 | 145 | solid solution | 1350 | 91500 | 87.5 | 0.9 |
| Comparative example 3 | 3.8 | 15000 | 3947 | 95 | solid solution | 1300 | 119000 | 229.1 | 1.9 |
| Comparative example 4 | 3.3 | 10500 | 3181 | 212 | peak for niobium nitride | 1200 | 76000 | 105.5 | 1.4 |
| Comparative example 5 | 2.5 | 250 | 10 | 279 | — | 1200 | 56000 | 115.5 | 2.1 |

As shown in Table 1, the examples 1 to 4 produced nitrogen containing tantalum powders or a nitrogen containing niobium powder with a W/S ratio between the nitrogen content W [ppm] and the specific surface area S [$m^2/g$] that fell within a range from 500 to 3000, whereas the powders obtained in the comparative examples 1 to 5 all displayed W/S ratios between the nitrogen content W [ppm] and the specific surface area S [m$^2$/g] that fell outside the above range.

The tantalum powders and the niobium powder produced in the examples 1 to 4 all displayed lower values for the direct leakage current (DLC) and the specific leakage current (DLC/CV) in the electrical characteristics evaluations than their corresponding comparative example, indicating an improvement in those properties.

INDUSTRIAL APPLICABILITY

As described above, a nitrogen containing metal powder of the present invention displays a ratio W/S between the nitrogen content W [ppm] of the powder, and the specific surface area S [m$^2$/g], as measured by a BET method, that falls within a range from 500 to 3000, and contains a suitable quantity of uniformly dispersed nitrogen regardless of the size of the specific surface area. Accordingly, by using this powder as a raw material for an anode electrode, the thus produced capacitor has a high capacitance, shows minimal leakage current, and offers excellent long term reliability.

What is claimed is:

1. A nitrogen containing metal powder comprising a metal powder that contains nitrogen, wherein a ratio W/S between a nitrogen content W [ppm], and a specific surface area S [m$^2$/g], as measured by a BET method, is within a range from 500 to 3000.

2. A nitrogen containing metal powder according to claim 1, wherein said nitrogen exists as a solid solution within said metal.

3. A nitrogen containing metal powder according to claim 1, wherein said metal is at least one metal selected from a group consisting of niobium, tantalum, and niobium-tantalum alloy.

4. A production process for a nitrogen containing metal powder according to claim 1, in which a metal salt containing said metal is reacted with a reducing agent and undergoes reduction within a molten diluent salt, thereby generating said metal, wherein a nitrogen containing gas is introduced into a space contacting a reaction melt comprising said metal salt, said reducing agent and said diluent salt, thereby generating said metal and incorporating said nitrogen within said metal.

5. A production process for a nitrogen containing metal powder according to claim 3, in which a metal salt containing said metal is reacted with a reducing agent and undergoes reduction within a molten diluent salt, thereby generating said metal, wherein a nitrogen containing gas is introduced into a space contacting a reaction melt comprising said metal salt, said reducing agent and said diluent salt, thereby generating said metal and incorporating said nitrogen within said metal.

6. A production process for a nitrogen containing metal powder according to claim 4, wherein said metal salt is a potassium fluoride salt of at least one of niobium and tantalum, and said reducing agent is sodium.

7. A production process for a nitrogen containing metal powder according to claim 5, wherein said metal salt is a potassium fluoride salt of at least one of niobium and tantalum, and said reducing agent is sodium.

8. A production process for a nitrogen containing metal powder according to claim 4, wherein said reducing agent and said metal salt are each added either continuously or in portions to said diluent salt.

9. A production process for a nitrogen containing metal powder according to claim 5, wherein said reducing agent and said metal salt are each added either continuously or in portions to said diluent salt.

10. A production process for a nitrogen containing metal powder according to claim 6, wherein said reducing agent and said metal salt are each added either continuously or in portions to said diluent salt.

11. A production process for a nitrogen containing metal powder according to claim 7, wherein said reducing agent and said metal salt are each added either continuously or in portions to said diluent salt.

12. A porous sintered body produced by sintering a nitrogen containing metal powder according to claim 1.

13. A porous sintered body produced by sintering a nitrogen containing metal powder according to claim 3.

14. A solid electrolytic capacitor equipped with an anode electrode formed from a porous sintered body according to claim 12.

15. A solid electrolytic capacitor equipped with an anode electrode formed from a porous sintered body according to claim 13.

16. A nitrogen containing metal powder according to claim 2, wherein said metal is at least one metal selected from a group consisting of niobium, tantalum, and niobium-tantalum alloy.

17. A production process for a nitrogen containing metal powder according to claim 2, in which a metal salt containing said metal is reacted with a reducing agent and undergoes reduction within a molten diluent salt, thereby generating said metal, wherein a nitrogen containing gas is introduced into a space contacting a reaction melt comprising said metal salt, said reducing agent and said diluent salt, thereby generating said metal and incorporating said nitrogen within said metal.

18. A porous sintered body produced by sintering a nitrogen containing metal powder according to claim 16.

19. A porous sintered body produced by sintering a nitrogen containing metal powder according to claim 2.

20. A solid electrolytic capacitor equipped with an anode electrode formed from a porous sintered body according to claim 19.

* * * * *